M. J. BARRETT.
AUTOMATIC VALVE.
APPLICATION FILED MAY 12, 1920.
1,396,394.
Patented Nov. 8, 1921.
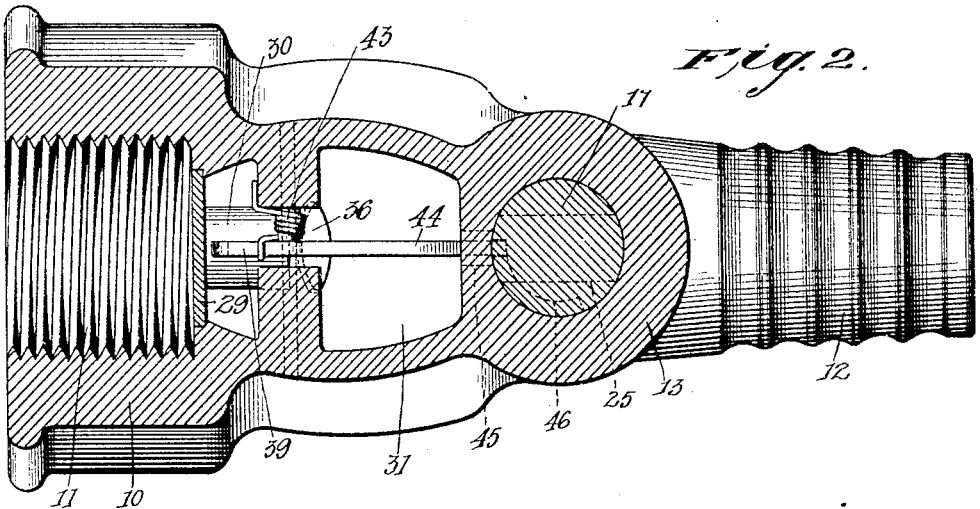
Fig. 2.
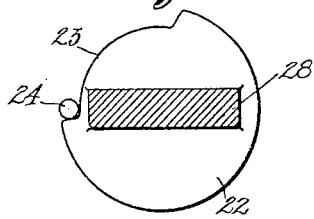
Fig. 3.
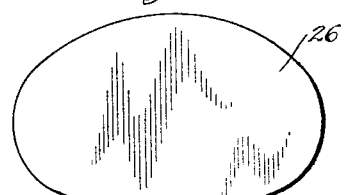
Fig. 1.
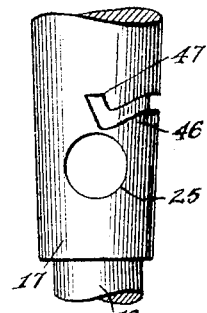
Fig. 4.
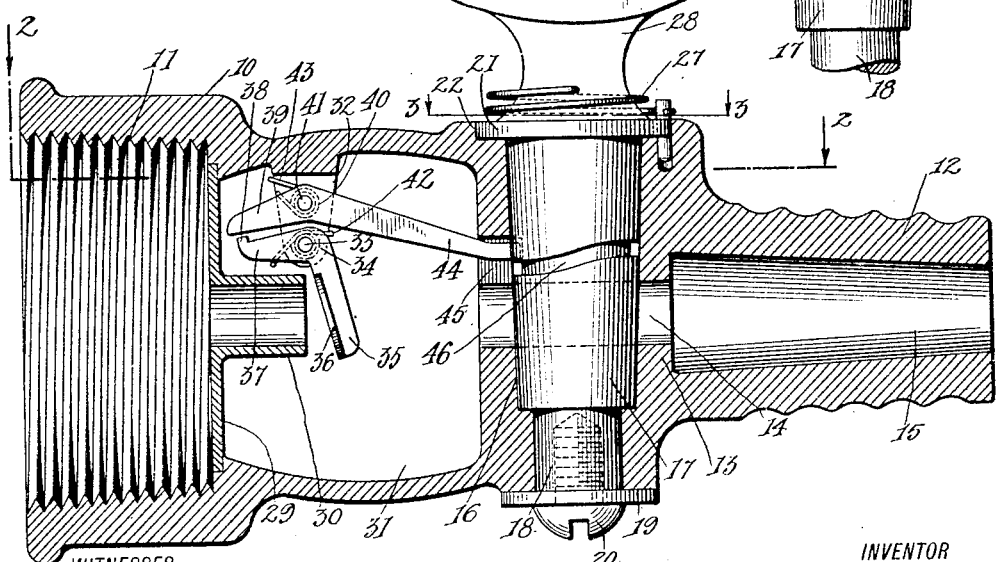
WITNESSES
H. C. Hebig
L. A. Paley
INVENTOR
MICHAEL J. BARRETT
BY
ATTORNEYS

UNITED STATES PATENT OFFICE.

MICHAEL J. BARRETT, OF BROOKLYN, NEW YORK.

AUTOMATIC VALVE.

1,396,394.   Specification of Letters Patent.   Patented Nov. 8, 1921.

Application filed May 12, 1920. Serial No. 380,829.

*To all whom it may concern:*

Be it known that I, MICHAEL J. BARRETT, a citizen of the United States, and a resident of the city of New York, borough of Brooklyn, county of Kings, and State of New York, have invented a new and useful Improvement in an Automatic Valve, of which the following is a full, clear, and exact description.

This invention relates to valves, and has reference more particularly to spring actuated valves for use on gas or liquid pipes which have lever means associated with a valve adapted to permit the closing of the valve when the pressure of the liquid or gas falls below a predetermined point.

It is a well known fact that when gas burners are in use, that a decrease in the gas pressure in the service pipes may cause the flame on the gas burner to be extinguished. When the pressure again comes up to normal, the gas will flow from the unlighted burner, and as a result, several persons may be fatally poisoned by the gas before the abnormal conditions are noticed.

An object of this invention therefore is to provide a valve which will automatically close when the pressure of the service pipe falls below a predetermined point.

Reference is to be had to the accompanying drawing forming a part of this specification, in which it is understood that the drawing illustrates only one form of the invention, and in which—

Figure 1 is a central sectional view through the valve.

Fig. 2 is a section through the valve on the line 2—2 of Fig. 1.

Fig. 3 is a section through the valve on the line 3—3 of Fig. 1.

Fig. 4 is a fragmentary view of the valve removed from its seat.

Referring to the accompanying drawing by numerals, 10 indicates a valve body which is provided with internal threads 11 adapted to engage similar threads on the end of a service pipe not shown. The body 10 of the valve terminates on the other end, in a nozzle 12 of smaller diameter which is adapted to receive a rubber hose or other gas connection. A partition 13 is formed intermediate the ends of the valve body 10, and a port 14 extends through said partition and serves to conduct the gas from the service pipe to a port 15 in the nozzle 12. A tapering valve seat 16 is formed in the partition 13, and a tapering valve 17 is adapted to engage said valve seat, said valve having a cylindrical section 18 which extends through the wall of the body 10. A washer 19 is connected to the section 18 by a screw 20 so that said washer serves to prevent the accidental removal of the valve 17.

A shoulder 21 is formed on the end of said valve 17 opposite the section 18, said shoulder being adapted to be rotatably received in a recess 22 in the valve body 10. An arcuate recess 23 is formed in the periphery of the shoulder 21, said recess having a depth approximately equal to the diameter of a pin 24 secured in the valve body 10, so that the end of said pin extends a short distance above the shoulder 21. This pin 24 coöperating with the recess 23, limits the movement of the valve to two extreme positions, a closed and an open position. A port 25 is formed in the valve 17 adapted to register with the port 14 when the valve is opened, and to be positioned at right angles to said port when the valve is closed. The valve is actuated by a handle 26 adapted to be grasped by the fingers. A spring 27 is coiled around a stem 28 on the handle 26, one end of said spring being secured to said stem 28, and the other end is attached to the end of the pin 24.

A circular plate 29 is formed in the valve body 10 adjacent the threads 11, and said plate is provided with a centrally located nozzle or orifice 30 which conducts the gas from the service pipe into a chamber 31 formed in the valve body 10. A forked support 32 is formed on the inside of the valve body 10 in the chamber 31 and a pin 33 is secured to the inner end of said support 32. A bell crank lever 34 is pivotally mounted on said pin 33, and one arm 35 of said lever is provided with a vane 36 which is adapted to register with and close the orifice 30 when the pressure of the gas falls below a predetermined point. The other arm 37 on the lever 34 is provided on its end with a lug 38 adapted to engage an arm 39 of a lever 40, pivotally mounted on a pin 41 secured to the support 32.

A spring 42 is coiled around the pin 33, one end being secured to the support 32 while the other end is secured to the arm 37 of the lever 34, said spring being adapted to normally hold the vane 36 in contact with the orifice 30. A spring 43 is coiled around the pin 41, one end of said spring engaging the arm 39 of the lever 40, while the other end of said spring engages the support 32. This spring 43 is adapted to normally hold the arm 39 in contact with the lug 38 of the lever 34, but the spring 42 is stronger than the spring 43 so that when the pressure of the gases decrease below a predetermined point, the lever 40 will be moved about its pivot 41 by the arm 37 of the lever 34 under the action of said spring 42.

An arm 44 opposite the arm 39 of the lever 40 is mounted in a slot 45 formed in the partition 13, and the end of said arm 44 engages a bayonet notch 46 formed in the valve 17, said notch having an obliquely extending portion 47 which is adapted to receive the end of the arm 44 so that the valve 17 will be maintained in an open position against the action of the spring 27, but said portion 47 is adapted to permit the valve 17 to be manually closed by the handle 26. While I have shown the valve especially adapted for use on gas pipes, the valve may be suitably modified for use on water pipes.

In operation, the gas issuing from the orifice 30 normally impinges on the vane 36 so as to hold the lever 34 in the position shown in Fig. 1, so that gas will enter the chamber 31, pass through the ports 14 and 25, and out of the nozzle 12 through the apparatus in which it is used. When the pressure of the gas decreases below a predetermined point, the lever 34 is moved about its pivot 33 so that the lug 38 engages the arm 39 of the lever 40, thus causing the end of the arm 44 to be disengaged from the portion 47 of the notch 46, so that the valve 17 will be automatically closed under the action of the spring 27.

Having thus described my invention, I claim as new and desire to secure by Letters Patent:

1. An automatic release for fluid valves having a valve body and a valve therein adapted to be moved into an open or closed position, said valve having a cam slot in its surface, a pivoted lever having one end engaging the slot in the valve, a spring adapted to hold said lever in its engaged position, a pivoted pressure vane, a spring coöperating with the pressure vane and tending to close it against the pressure of the fluid, one end of the pivoted vane adapted to coöperate with one end of the pivoted valve-engaging lever when the pressure falls below a predetermined amount, whereby said lever is withdrawn from the slot in the valve, and a spring on the valve adapted to close it when it is thus released.

2. An automatic release for fluid valves having a valve body and a valve therein adapted to be moved into an open or closed position, said valve having a curved slot therein, said slot having an offset locking portion therein, a pivoted lever having one end adapted to engage in said slot, a spring coöperating with and tending to move said lever to a normal locking position, a pivoted pressure vane, a spring coöperating with the pressure vane and tending to close it against the pressure of the fluid, one end of the pivoted vane adapted to coöperate with one end of the pivoted valve-engaging lever when the pressure falls below a predetermined amount, said valve-engaging lever adapted to engage in the offset locking portion of the slot when the valve is moved to open position, said vane adapted to operate to release the valve-engaging lever whereby the lever is withdrawn from the locking portion of the slot in the valve when the pressure falls below a predetermined amount, and a spring on the valve adapted to close it when it is thus released.

MICHAEL J. BARRETT.